United States Patent [19]

Nagaoka

[11] Patent Number: 5,622,625
[45] Date of Patent: Apr. 22, 1997

[54] METHOD OF MANUFACTURING A DRUM

[75] Inventor: Tadayoshi Nagaoka, Miharamachi, Japan

[73] Assignee: Nagaoka International Corp., Japan

[21] Appl. No.: 629,536

[22] Filed: Apr. 9, 1996

Related U.S. Application Data

[62] Division of Ser. No. 427,089, Apr. 21, 1995.
[51] Int. Cl.$^6$ .......................... B01D 39/10; B01D 33/06
[52] U.S. Cl. .......................... 210/232; 210/402; 209/270; 29/603.17; 29/603.23; 29/896.61; 29/896.62
[58] Field of Search ..................... 210/384, 385, 210/391, 402, 403, 404, 386, 232; 209/270, 288, 296, 393; 29/603.17, 603.23, 896.62, 896.61

[56] References Cited

U.S. PATENT DOCUMENTS

| | | | |
|---|---|---|---|
| 3,962,091 | 6/1976 | Doria et al. | 210/402 |
| 4,155,693 | 5/1979 | Raley | 264/504 |
| 4,236,999 | 12/1980 | Burgess et al. | 210/403 |

*Primary Examiner*—David A. Reifsnyder
*Attorney, Agent, or Firm*—Hedman, Gibson & Costigan, P.C.

[57] ABSTRACT

A rotary drum type device for separating solid particles from a liquid includes a rotary screen drum having support rods extending in the axial direction and arranged cylindrically and having a projecting portion in a radially outward end portion, and a wedge wire wound spirally on the outer periphery of the support rods in substantially crossing direction to the support rods. The wedge wire is arranged with its one side facing outward and two other sides forming a slit which widens radially inwardly between adjacent wedge wire portions and with an inward apex of said wedge wire being welded to the projecting portion of the support rods at crossing points. The rotary drum type device further includes a container containing a liquid to be treated disposed outside of the rotary screen drum, a suction device connected to the rotary screen drum for reducing pressure in the rotary screen drum, and a scraper for stripping off cake produced on the outer periphery of the rotary screen drum. The width of the slit of the wedge wire is within a range between 1 micron and 150 microns.

1 Claim, 11 Drawing Sheets

FIG. 19
PRIOR ART

METHOD OF MANUFACTURING A DRUM

This is a divisional, of application Ser. No. 08/427,089, filed Apr. 21, 1995 now allowed.

BACKGROUND OF THE INVENTION

This invention relates to a rotary drum type device for separating solid particles from a liquid.

Known in the art of separating solid particles from liquids such as sewage sludge and contaminated liquid is a vacuum filtration system using a vacuum dehydrator. The vacuum dehydrator has a rotary screen drum on which a filter cloth is attached. The rotary screen drum is partly submerged in a container containing a liquid to be treated and pressure of the inside of the rotary screen drum is reduced by operating a vacuum pump while the rotary screen drum is rotated. The liquid to be treated is thereby dehydrated and cake of solid particles is produced on the surface of the filter cloth and this cake is scraped off at the end of one cycle of the rotary screen drum by means of a scraper.

The prior art vacuum dehydrator however has the disadvantage that meshes of the filter cloth used as an element for separating solid particles from a liquid tend to be filled with solid particles during each cycle with resulting prompt reduction in filtration efficiency.

There has been proposed, as disclosed in U.S. Pat. No. 4,407,720, a rotary drum type device for separating solid particles from a liquid which includes a rotary screen drum in which the conventional filter cloth is replaced by a wedge wire provided on the periphery of the screen drum.

It is however impossible for this prior art device in which the screen surface is formed by wedge wire to realize a fine slit of less than 150 microns between adjacent wedge wire sections by reason of manufacturing technique and therefore it is only possible for this type of device to filter out solid particles having a diameter exceeding 150 microns. In case it is necessary for this type of device to separate solid particles having a diameter of less than 150 microns, an extra filter material such as a filter cloth must be attached on the wedge wire screen surface as described in column 1, lines 18–24 and column 2, lines 64–66 of the above mentioned U.S. Pat. No. 4,407,720. In this case, the problem of blockage of meshes of the filter cloth by solid particles arises in the same manner as in the conventional rotary drum screen using filter cloth on the screen surface.

Thus, in the prior art rotary drum type device for separating solid particles from a liquid which uses a wedge wire on the screen surface, it becomes necessary to attach a complex and large device for removing blocking of meshes of filter cloth or, alternatively, to separate solid particles by adding an expensive coagulating agent to a liquid to be treated and thereby coagulate solid particles into particles of a larger diameter which can be caught at the slits of the wedge wire.

It is, therefore, a first object of the invention to eliminate the disadvantage of the prior art rotary drum type device for separating solid particles from a liquid using a filter cloth and the prior art rotary drum type device using a wedge wire and provide a novel rotary drum type device for separating solid particles from a liquid which has less tendency to causing blockage than a filter cloth and is capable of removing blockage easily when it occurs and moreover capable of separating super fine solid particles without need for addition of an expensive coagulating agent.

The conventional rotary screen drum using a wedge wire as its screen surface is generally manufactured in the following manner.

Figure 18A:
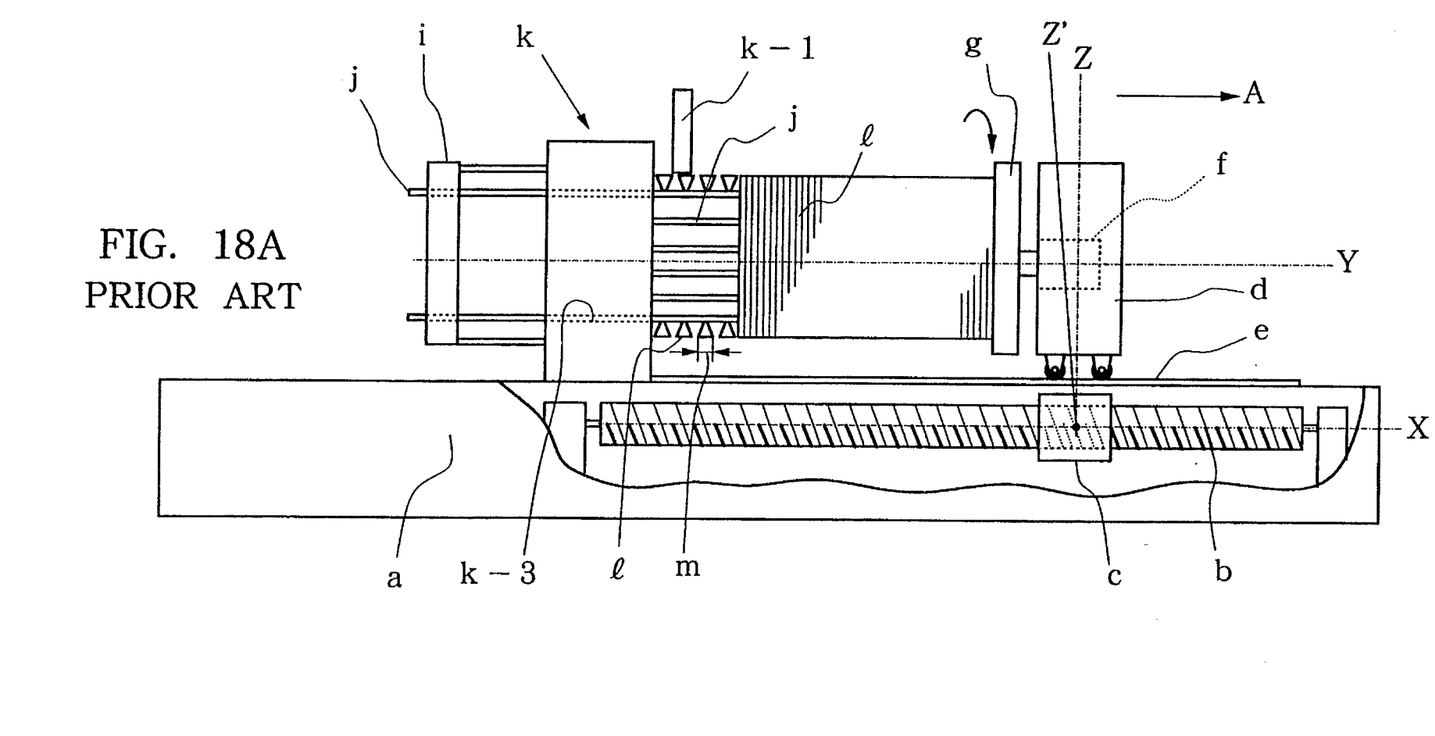
FIGS. 18A and 18B are views showing an example of device for manufacturing a prior art screen drum.
Figure 18B:
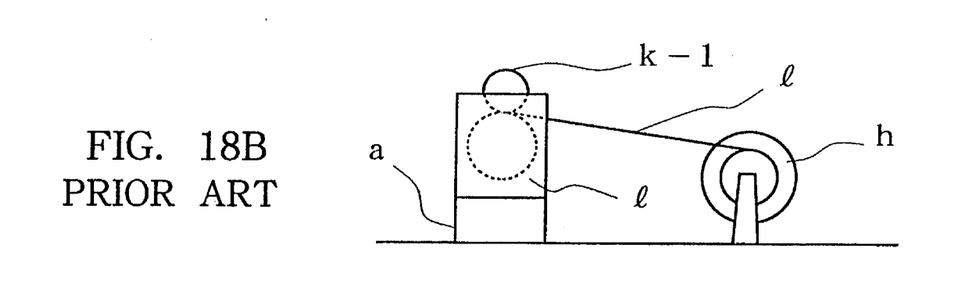

An apparatus for manufacturing the conventional rotary screen drum using a wedge wire as its screen surface includes, as shown in FIG. 18, a screw b disposed to be rotated in a bed a. A slide c is in threaded engagement with the screw b and a carriage d is fixed to the slide c in such a manner that the carriage d can move along rails e laid on the bed a. A disk-like front support rod holder g is rotatably supported on a bearing f provided in the carriage d. An electric resistance type welder k is fixedly mounted on the bed a behind the front support rod holder g. In the rear of the welder k is rotatably disposed a disk-like rear support rod holder i. A plurality of support rods j are generally cylindrically arranged in the circumferential direction at a predetermined interval and these support rods j are held at either end thereof by the support rod holders g and i. By driving and rotating the screw b in one direction by an unillustrated drive mechanism, the carriage d is moved in direction A on the rails e. Simultaneously, a wedge wire 1 is fed from a wedge wire supplier h (shown in FIG. 18B) and wound spirally on the cylindrically arranged support rods j. A part of wedge wire wound on the support rods j is shown in a section. The wound wedge wire 1 and the support rods j are welded to each other at their crossing points by the electric resistance welder k.

Figure 19:
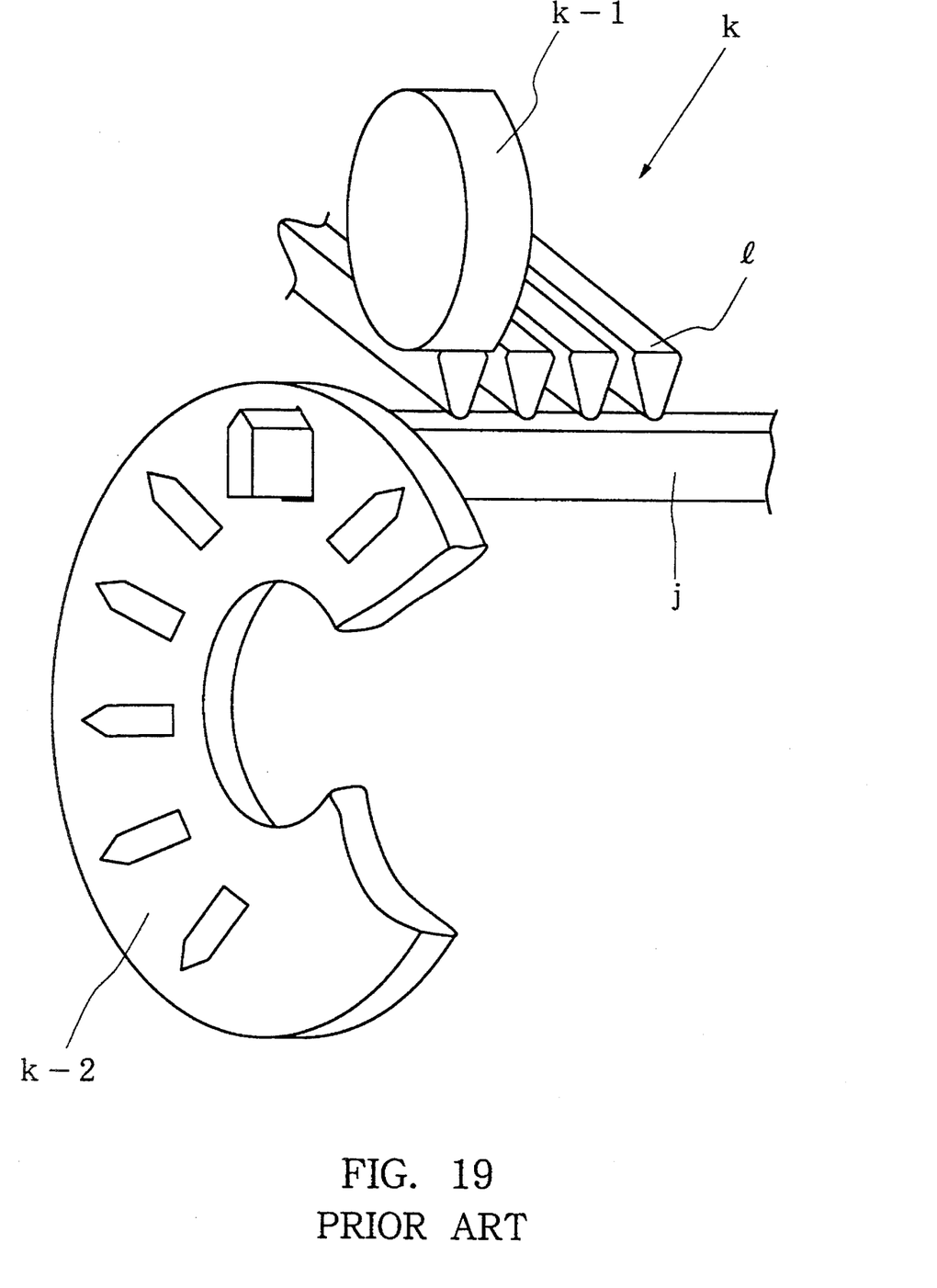
FIG. 19 is a view showing a prior art electric resistance type welder.

This electric resistance type welder k has, as shown in FIG. 19, an upper electrode k-1 disposed outside of the wedge wire 1 and a lower electrode k-2 formed with openings through which the support rods j are supported. The upper electrode k-1 is in contact with the wedge wire 1 and the lower electrode k-2 is in contact with the support rods j. The wedge wire 1 has its smooth side directed radially outwardly and its apex opposite to the smooth surface in abutting contact with the radially outwardly projecting portion of each support rod j. FIG. 19 shows a part of the spirally wound wedge wire 1 in section.

In this prior art apparatus for manufacturing a rotary screen drum, there is usually distance of 500 mm to 600 mm between the axis X of the screw b and the axis Y of the screen drum. This distance causes an error in feeding of the screen drum in the direction of A due to deflection of the carriage d and a gap in feeding. More specifically, according to this device, an accurate slit of the wedge wire 1 can be formed on condition that feeding of the screw b in the direction A is accurately transmitted to feeding of the screen in the direction A. In actuality, however, due to weight of the screen and also to friction caused by sliding of the support rods j through an opening k-3 of the welder k when the screen is fed in the direction A, the vertical axis of Z of the carriage d is deflected to the axis Z'. Therefore, the carriage d is not fed in the direction A with its vertical axis Z exactly crossing normally to the axis X of the screw b. Therefore, the inclination Z–Z' of the vertical axis Z of the carriage b causes an error in transmission of feeding of the screw b to feeding of the screen. Consequently, it is extremely difficult to achieve an accurate feeding which is required to realize a super fine slit width of 150 microns or less.

Further, according to welding by the conventional electric resistance type welder, electric currents of a large value flow in each of the wedge wire 1 and the support rods j and welding is achieved by utilizing a high heat which is produced when the apex of the wedge wire 1 is brought into contact with the projecting portion of the support rod j. Thus, the wedge wire 1 and the support rods j are repeatedly subjected to a highly heated state and a cooled state during the welding process which causes distortion due to heat. This heat distortion causes a subtle error in the width of slit m of the wedge wire 1 wound on the support rods j and, for this reason also, it is impossible to realize a super fine slit of 150 microns or less by the prior art apparatus.

It is, therefore, a second object of the present invention to provide a method for manufacturing a rotary screen drum suitable for use in the rotary drum type device for separating solid particles from a liquid achieving the first object of the invention.

SUMMARY OF THE INVENTION

The rotary drum type device for separating solid particles from a liquid achieving the first object of the invention comprises a rotary screen drum including support rods extending in the axial direction of the screen drum and arranged generally cylindrically with a predetermined interval, said support rods having a projecting portion in a radially outward end portion, and a wedge wire wound spirally on the outer periphery of the support rods in substantially crossing direction to the support rods, said wedge wire being arranged with its one side facing outward and two other sides forming a slit which widens radially inwardly between adjacent wedge wire portions and with an inward apex of said wedge wire being welded to the projecting portion of the support rods at crossing points of the wedge wire and the support rods, a container containing a liquid to be treated disposed outside of the rotary screen drum, a suction device connected to the rotary screen drum for reducing pressure in the rotary screen drum, and scraper means for stripping off cake produced on the outer periphery of the rotary screen drum, the width of said slit of the wedge wire being within a range between 1 micron and 150 microns.

According to the invention, by forming the slit of the wedge wire as a super fine slit having a width within a range between 1 micron and 150 microns, fine solid particles having a diameter from 1 micron to 150 microns which could in the past be separated only by employing a filter cloth on the screen surface or by coagulating the solid particles into particles of a larger diameter by adding a coagulating agent can be separated easily by the device of the invention without using the filter cloth or any other filtering material or using an expensive coagulating agent.

In one aspect of the invention, a rotary drum type device further comprises one or more rolls which are disposed in parallel to the screen drum with a predetermined interval between the outer periphery of the roll and the outer periphery of the screen drum, said rolls being capable of pressing cake produced on the outer periphery of the screen drum and thereby enhancing dehydration of the cake.

By pressing the cake produced on the periphery of the screen drum by the rolls, the cake can be dehydrated more effectively.

In another aspect of the invention, a rotary drum type device further comprises guide rolls which are disposed in parallel to the screen drum with a predetermined interval between the outer periphery of said guide rolls and the outer periphery of the screen drum, and an end belt provided along the guide rolls for covering the cake produced on the outer periphery of the screen drum.

By covering the cake from outside by the endless belt, the cake is sealed from the outside air and this contributes to increase in the suction force acting in the screen drum and thereby enhances dehydration of the cake.

In another aspect of the invention, a rotary drum type device further comprises a wire brush provided in contact with the outer periphery of the screen drum and extending in the axial direction of the screen drum for preventing blocking of the slit of the wedge wire by the cake.

In another aspect of the invention, a rotary drum type device further comprises a scraper plate provided in contact with the outer periphery of the screen drum and extending in the axial direction of the screen drum for preventing blocking of the slit of the wedge wire by the cake.

In another aspect of the rotary drum type device further comprises a line of fluid injecting nozzles provided in close proximity either to the inside or outside of the screen drum and extending in the axial direction of the screen drum for injecting fluid onto the screen drum and thereby rinsing the screen drum.

In another aspect of the invention, a rotary drum type device further comprises a vibrator provided at a location at which it can impart vibration to the screen drum.

Since the wedge wire is used as the screen surface in the device according to the invention and no other filter material such as a filter cloth is required, occurrence of blocking due to solid particles is less frequent owing to the proper function of the wedge wire. Consequently, by mounting a relatively simple means such as wire brush, scraper, fluid injecting nozzles and vibrator as described above, blocking of the slit of wedge wire can be removed while the device is continuously operating without stopping for an operation for removing blocking of the slit. Consequently, a complex and large device such as a backwashing system used in the prior art device can be obviated.

While it is a feature of the invention that the device does not need any other filter material such as a filter cloth, a filter material having a predetermined thickness may be provided on the outer periphery of the screen drum and the width of the slit may be set at a relatively large value below 150 microns.

In another aspect of the invention, a rotary drum type device for separating solid particles from a liquid has basically the same structure as the first described device but is different from the basic structure in that the wedge wire is not wound spirally as in the basic structure but is provided on the support rods in the form of separate rings disposed in parallel to each other.

In another aspect of the invention, a rotary drum type device further comprises a filler including a plurality of filler plates in the form of thin plates having a thickness which enables the filler plates to be inserted in the slits between the rings and each being provided for each of the slits and a holder rod holding these filler plates, said filler being disposed in the axial direction of the screen drum in such a manner that the filler plates are inserted in the respective slits between the rings.

By adopting parallel rings instead of a spiral wire, when the screen drum is continuously rotated in a state in which the filler plates are inserted in the slits, the filler plates do not interfere with the wedge wire in the form of the parallel rings and, accordingly, blocking of the slits can be completely prevented with a simple mechanism.

A method for manufacturing a rotary screen drum used for the rotary drum type device for separating solid particles from a liquid for achieving the second object of the invention comprises the steps of:

(a) preparing for a screen drum manufacturing apparatus including a screw supported rotatably on a support frame;

rails laid under the screw;

a screw cover which extends coaxially with the screw and is threadedly engaged on the screw and has wheels rotatably engaged with the rails, said screw cover sliding along the screw by rotation of the screw;

an annular front support rod holder rotatably supported in the vicinity of a forward end of the screw cover and holding one end portions of support rods;

an annular rear support rod holder rotatably supported in the vicinity of a rear end of the screw cover and holding the other end of the support rods;

drive means for driving and rotating the front support rod holder;

a wedge wire supply drum for storing a wedge wire;

a pressure roll which is disposed in parallel to the screw cover at a predetermined interval from the outer periphery of the screw cover for pressing the wedge wire wound on the support rods to the support rods;

a wedge wire holder which is mounted on a frame vertically pivotably at a location immediately before the wedge wire is wound on the support rods and has a wedge wire insertion opening having a size slightly larger than the cross section of the wedge wire and having a configuration similar to the cross section of the wedge wire and which has has foremost end portion having a configuration similar to a bird's bill; and a laser welder disposed at a location immediately after the wedge wire is wound on the support rods;

(b) placing support rods having a projection in a radially outward end portion circumferentially generally in a cylindrical configuration between the front support rod holder and the rear support rod holder and holding the support rods by the front and rear support rod holders;

(c) feeding the cylindrical support rods in one direction by rotating the screw and simultaneously feeding the wedge wire from the wedge wire supply drum and winding the wedge wire on the cylindrical support rods through the wedge wire holder; and (d) welding an inner apex portion of the wedge wire to the projections of the support rods at each crossing point of the wedge wire with the support rods.

According to this method, since the screen drum is disposed coaxial with the screw, feeding of the screw coincides completely with feeding of the screen drum and there is no discrepancy between them. Secondly, welding is made by controlling laser beam instead of electric resistance welding. According to this welding, laser beam is projected at a limited, narrow portion in the apex of the wedge wire and the projecting portion of the support rod at a moment when the wedge wire contacts the support rod and welding is completed instantaneously, so that the entire wedge wire and support rods are not influenced by heat and no distortion due to heat takes place. Thirdly, by the provision of the wedge wire holder having a bill-like foremost end portion at a location immediately before the wedge wire is wound on the support rods, the wedge wire holder can be inserted in a narrow gap defined between the cylindrical support rods and the pressure roll located above the support rods and, accordingly, flextion and twisting of the wedge wire can be controlled completely and extremely accurate positioning of the wedge wire immediately before a welding spot can be achieved. Owing to combination of the above described first to third novel features, by manufacturing a screen drum by employing this manufacturing device, a screen drum having a super fine slit of wedge wire having a width from 1 micron to 150 microns can be manufactured.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
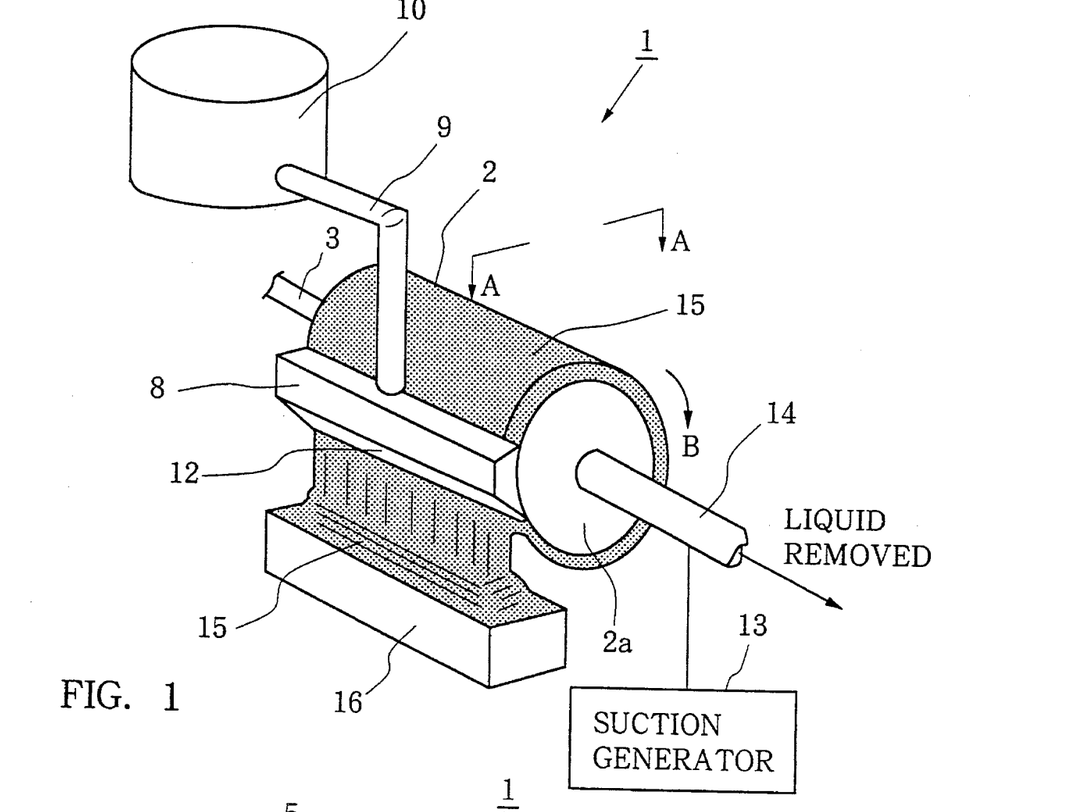
FIG. 1 is a perspective view showing an embodiment of the rotary drum type device for separating solid particles from a liquid made according to the invention.
Figure 2:
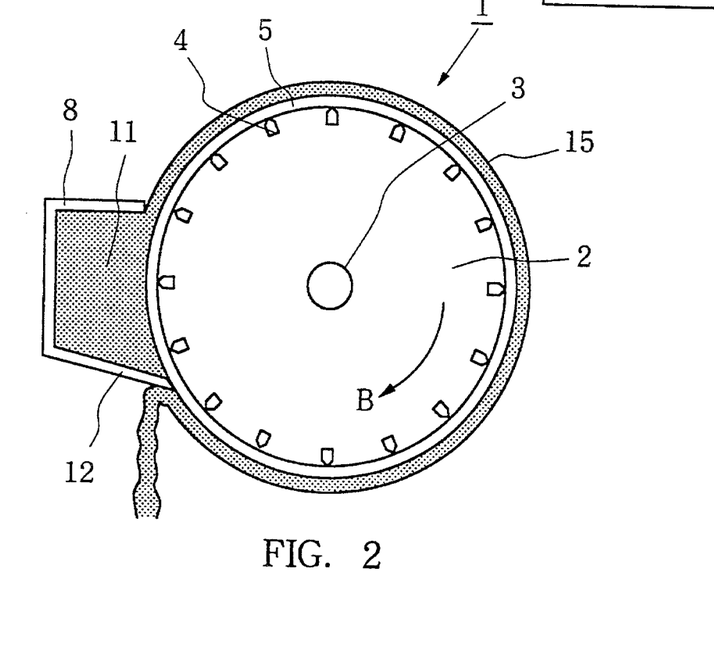
FIG. 2 is a sectional view taken along lines A—A in FIG. 1.
Figure 3:
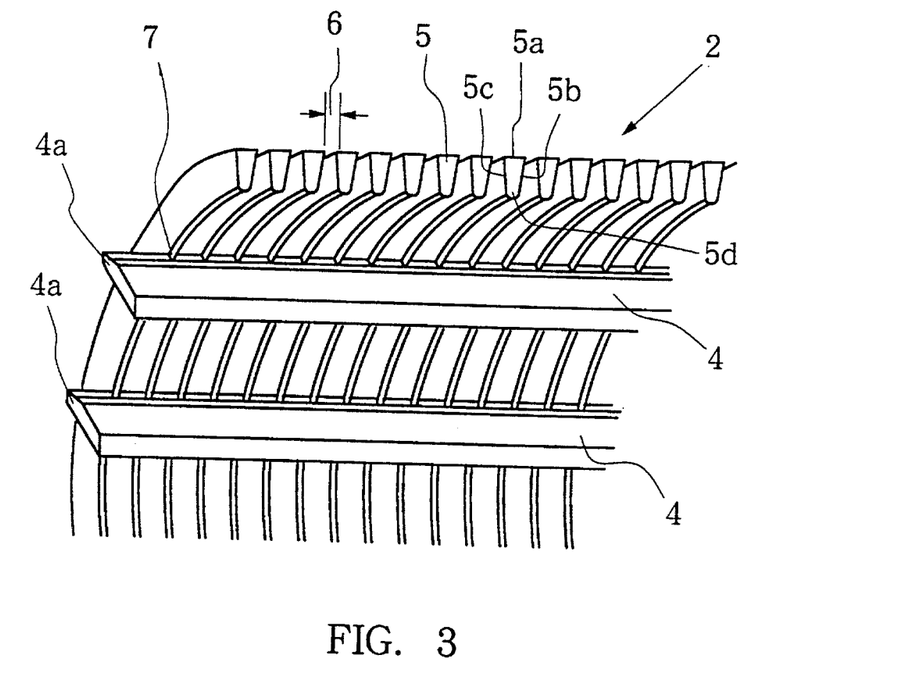
FIG. 3 is a perspective view showing a part of the screen drum in an enlarged scale.

Referring to FIGS. 1 to 3, an embodiment of the invention will be described.

A rotary drum type device 1 for separating solid particles from a liquid has a screen drum 2 fixed to a rotary shaft 3. The rotary shaft 3 is connected to a known drive mechanism (not shown) which can drive and rotate the screen drum 2. The rotary screen drum 2 has, as will be clear from FIG. 3, support rods 4 extending in the axial direction of the screen drum 2 and arranged generally cylindrically with a predetermined interval and having a projecting portion 4a in a radially outward end portion and a wedge wire 5 wound spirally on the outer periphery of the support rods 4 in substantially crossing direction to the support rods 4. The wedge wire 5 is arranged with its one side 5a facing outside and two other sides 5b and 5c forming a slit 6 which widens radially inwardly between adjacent wedge wire portions and with an inward apex 5d of said wedge wire 5 being welded to the projecting portion 4a of the support rods 4 at crossing points 7 of the wedge wire 5 and the support rods 4. The ends of the screen drum 2 are closed by seal plates 2a.

A box type container 8 for temporarily storing a liquid 11 to be treated having a high water content rate such as sludge and supplying this liquid 11 to the screen drum 2 is provided outside of the screen drum 2, extending in parallel to the screen drum 2. The container 8 communicates with a tank 10 storing the liquid 11 to be treated and receives the liquid 11 from the tank 10. The container 8 has an opening on the side facing the screen drum 2 so that the liquid 11 will be deposited on the outer periphery of the screen drum 2 and carried out of the container 8 as the screen drum 2 is rotated. In the present embodiment, a bottom plate 12 of the container 8 has an inclined opening end which is in contact with the outer periphery of the screen drum 2. This inclined opening end functions as a scraper means for stripping off cake deposited on the periphery of the screen drum 2.

The inside space of the hollow screen drum 2 is connected to a known suction generator 13 such as a vacuum pump. By operating this suction generator 13, the pressure inside of the screen drum is reduced.

The screen drum 2 has also a liquid takeout tube 14 for taking out a liquid content collected from the liquid 11 by suction.

The width of the slit 6 of the wedge wire 5 of the screen drum 2 is set at a suitable value within a range between 1 micron to 150 microns having regard to the type and nature of the liquid to be treated, the purpose of treatment etc.

The operation of the device 1 will now be described.

The liquid 11 to be treated is supplied from the tank 10 to the container 8 and the screen drum 2 is rotated in the direction of arrow B while the suction generator 13 is operated. The liquid 11 to be treated is deposited on the screen surface consisting of the wedge wire 5 of the rotating screen drum 2 and carried out of the container 8. Since the inside of the screen drum 2 is reduced in pressure by the operation of the suction generator 13 and, therefore, a majority of the liquid content of the liquid 11 to be treated is sucked into the inside of the screen drum 2 through the slit 6 and taken out of the screen drum 2 through the liquid takeout tube 14. Among solid particles floating or being suspended in the liquid 11, those having a diameter which is larger than the width of the slit 6 remain on the screen surface and carried as cake 15 having a relatively small water content rate and deposited on the screen surface. Before one cycle of the screen drum 2 after production of the cake 15, the cake 15 comes into abutting contact with the bottom plate 12 of the container 8 which functions as a scraper means and is stripped off the outer periphery of the screen drum 2. The cake 15 thus stripped off the screen drum 2 falls into a cake collection box 16 and accumulated therein and then is taken outside. The above operation is repeated and the liquid 11 is continuously collected from the screen drum as the cake 15 of a low water content rate.

Figure 4:
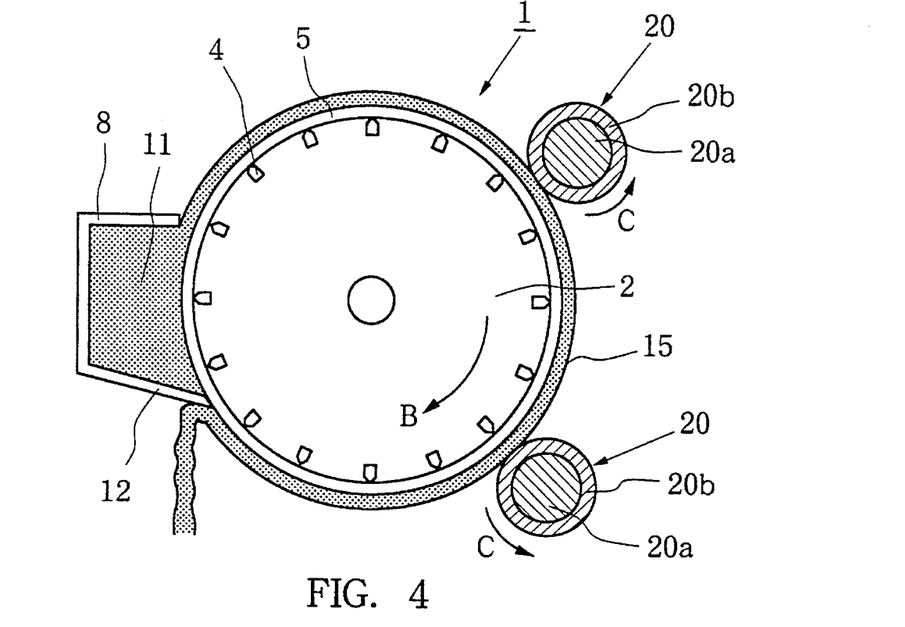
FIG. 4 is a sectional view similar to FIG. 2 showing another embodiment of the invention.

FIG. 4 shows another embodiment of the invention. In this and subsequent embodiments, the same component parts as the embodiment of FIGS. 1 to 3 are designated by the same reference characters and detailed description thereof will be omitted.

In the embodiment of FIG. 4, two rolls 20 are disposed in parallel to the screen drum 2. These rolls 20 are made by bonding a rubber sheet 20b about an iron core 20a. The gap between the rolls 20 and the outer periphery of the screen drum 2 is set at a value which is slightly smaller than the thickness of the cake 15 formed on the screen drum 2.

By this arrangement, as the screen drum 2 is rotated in the direction of arrow B, the rolls 20 come into contact with the cake 15 formed on the outer periphery of the screen drum 2 and are thereby rotated in the direction of arrow C. The cake 15 is pressed by the rolls 20 and liquid content in the cake 15 is thereby squeezed out resulting in reduction in the water content rate of the cake 15.

Figure 5:
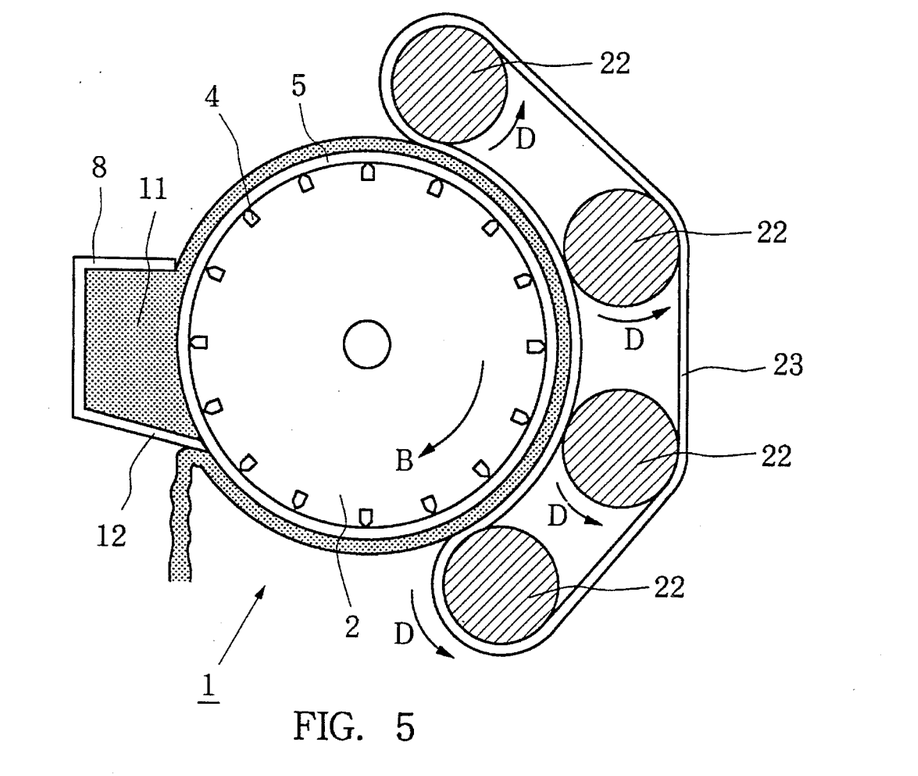
FIG. 5 is a sectional view similar to FIG. 2 showing another embodiment of the invention.

FIG. 5 shows another embodiment of the invention. In this embodiment, four guide rolls 22 which are disposed in parallel to the screen drum 2 with a predetermined interval between the outer periphery of the guide rolls 22 and outer periphery of the screen drum 2. An endless belt 23 is provided along the guide rolls 22 for covering the cake 15 produced on the outer periphery of the screen drum 2.

By this arrangement, as the screen drum 2 is rotated in the direction B, the endless belt 23 comes into abutting contact with the cake 15 formed on the outer periphery of the screen drum 2 and thereby is driven. By this driving of the endless belt 23, the guide rolls 22 are driven and rotated in the direction of arrow D. Since the endless belt 23 covers the cake 15 from the outside, the cake 15 is sealed from the outside air and this contributes to increase in the suction force acting in the screen drum 2 and thereby enhances dehydration of the cake.

FIGS. 6 to 10 show another embodiment of the invention which include blocking prevention means and various blocking prevention means used in this embodiment. The basic structure of this embodiment is the same as the embodiment of FIGS. 1 to 3.

Figure 7:
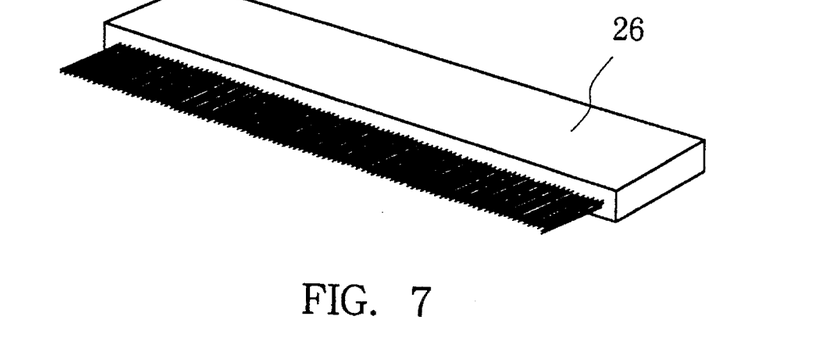
FIG. 7 is a perspective view showing a wire brush used in the embodiment of FIG. 6.

In FIG. 7, as means for preventing blocking of the slit 6 of the wedge wire 5, a wire brush 26 extending in the axial direction of the screen drum 2 is provided in the container 8.

Figure 6:
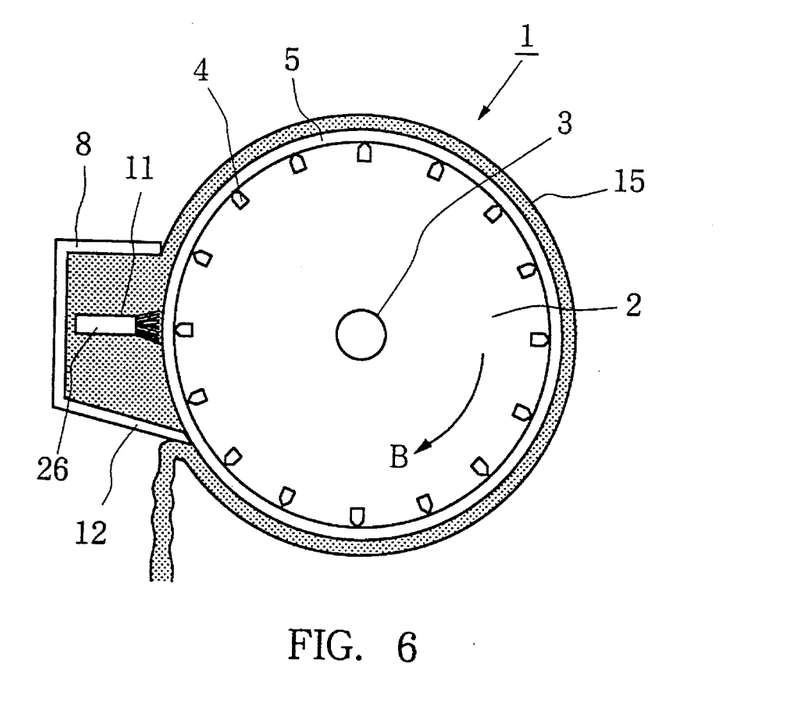
FIG. 6 is a sectional view similar to FIG. 2 showing another embodiment of the invention.
Figure 8:
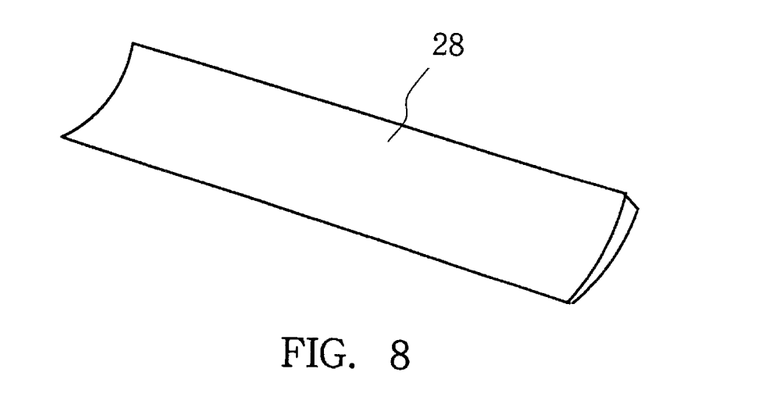
FIG. 8 is a perspective view showing a scraper plate used in the embodiment of FIG. 6.
Figure 9:
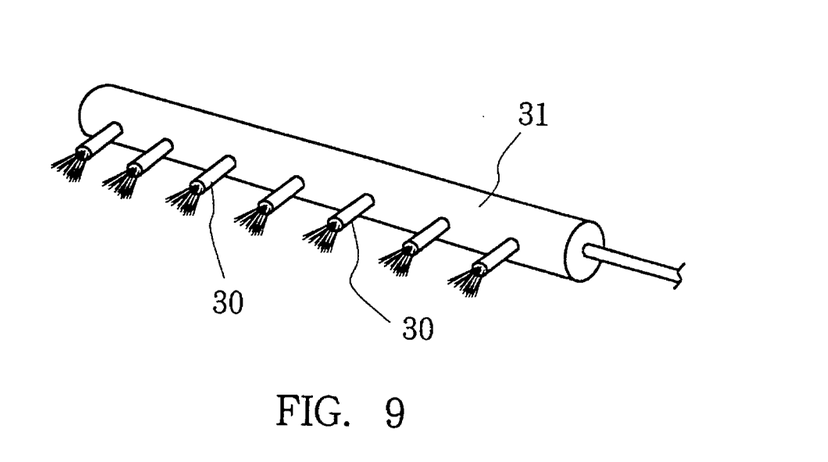
FIG. 9 is a perspective view showing another embodiment of the invention.

As the blocking prevention means used in the embodiment of FIG. 6, the wire brush 26 may be replaced by a scraper plate 28 provided in contact with the outer periphery of the screen drum 2 and extending in the axial direction of the screen drum 2. Alternatively, as shown in FIG. 9, a nozzle tube 31 having a line of fluid injecting nozzles 30 may be provided in close proximity either to the inside or outside of the screen drum 2 and extending in the axial direction of the screen drum 2 and the nozzle tube 31 may be connected to a fluid supply source (not shown) for injecting fluid such as air or water from the nozzles 30 onto the screen drum 2 and thereby rinsing the screen drum 2.

Figure 10:
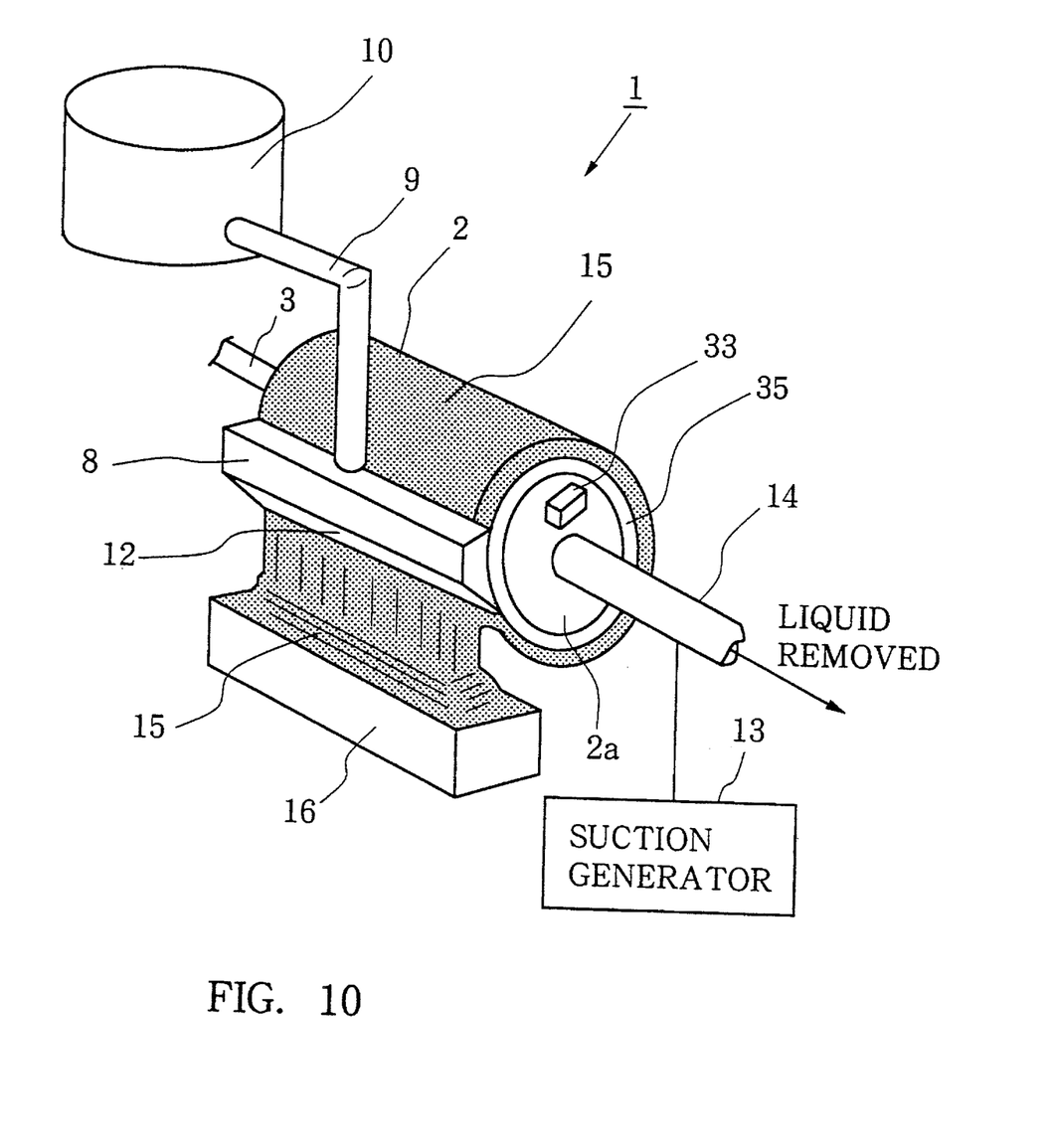
FIG. 10 is a perspective view showing another embodiment of the invention.
Figure 11:
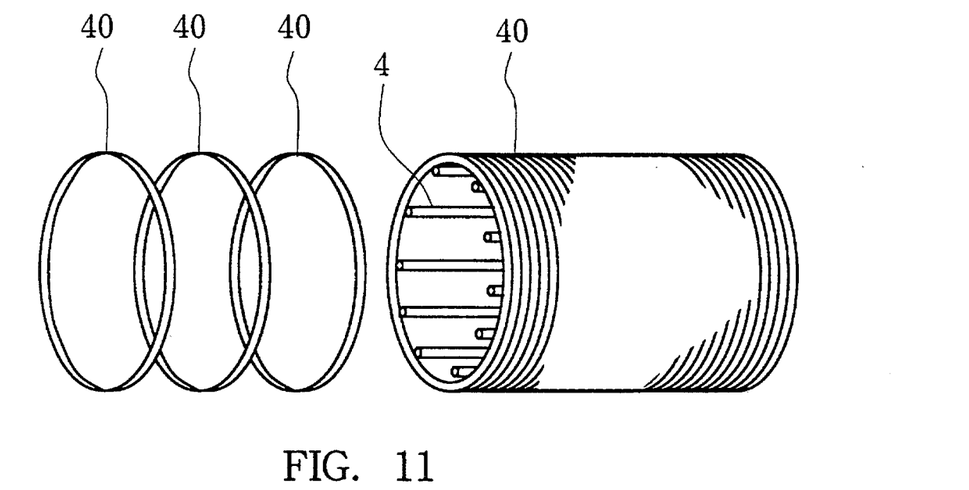
FIG. 11 is a perspective view, partly in an exploded state, showing a screen drum used in another embodiment of the invention.

Alternatively, as shown in FIG. 10, a known electrically or pneumatically operated vibrator 33 may be provided on the seal plate 2a of the screen drum 2 in addition to the basic structure of the embodiment of FIGS. 1 to 3 so as to impart vibration regularly to the screen drum 2 and thereby remove blocking of the slit 6.

In another embodiment of the invention, as shown in FIG. 10, the slit 6 of the wedge wire 5 may be set at a relatively large value below 150 microns (e.g., 100 microns to 150 microns) and a filter layer 35 may be formed on the outer periphery of the screen drum 2 by providing a filter material such as diatom earth. Separation of solid particles from a liquid can be achieved mainly by this filter layer 35.

FIGS. 11 to 14 show another embodiment of the invention. The device for separating solid particles from a liquid has substantially the same basic structure as the embodiment shown in FIG. 6 except that, in the embodiment of FIG. 6, the wedge wire 5 is wound spirally on the cylindrically arranged support rods 4 whereas in the present embodiment, the wedge wire is constructed of a plurality of parallel rings which are wound annularly on the support rods 4. Slits 41 are formed between respective rings 40 and the width of the slits 41 is set within a range between 1 micron to 150 microns in the same manner as in the embodiment of FIG. 6.

Figure 12A:
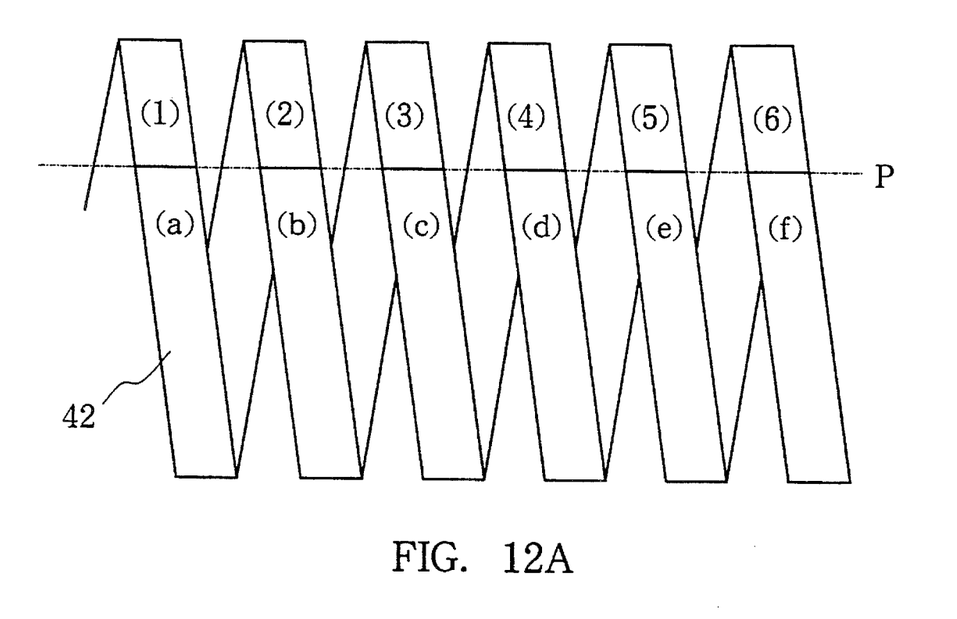
FIG. 12A is a view showing a spiral wedge wire used for making parallel rings in the embodiment using the parallel ring type wedge wire.
Figure 12B:
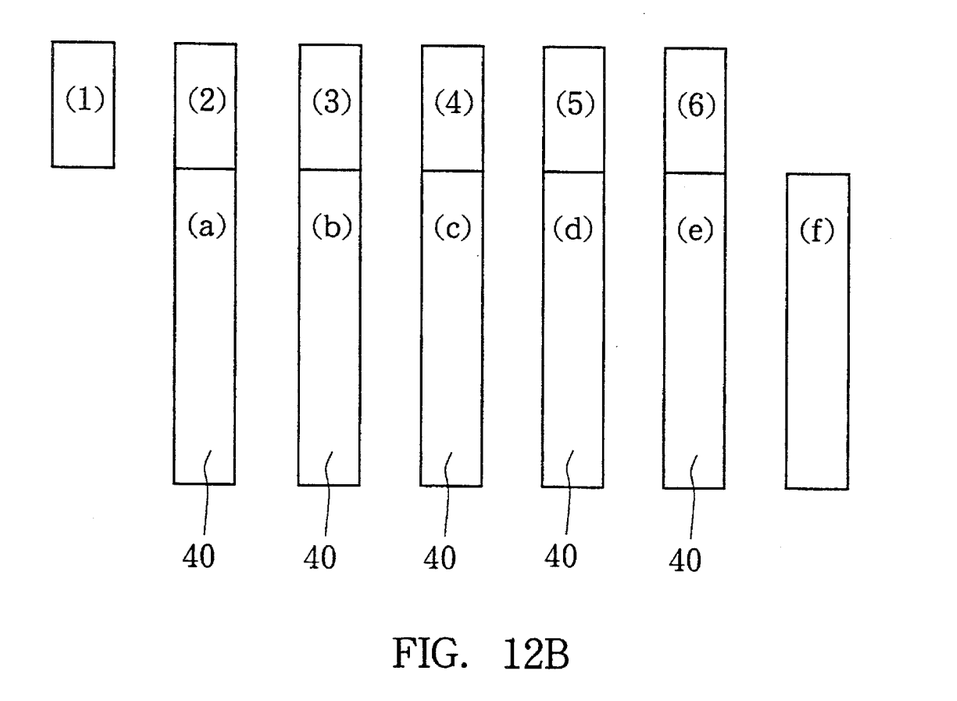
FIG. 12B is a view showing a state in which the spiral wedge wire is partly cut and welded after shifting one pitch.

For forming these parallel wedge wire rings 40, a wedge wire 42 is spirally wound on the cylindrically arranged support rods 4 as shown in FIG. 12A. Then, this spiral wedge wire 42 is cut into upper portions (1), (2), (3), (4), (5) and (6) and lower portions (a), (b), (c), (d), (e) and (f) along line P in FIG. 12A. Then, either the upper portion or lower portion of the cut wedge wire 42 is pulled horizontally to shift one pitch and the upper portion (2) is welded to the lower portion (a), the upper portion (3) to the lower portion (b), the upper portion (4) to the lower portion (c), the upper portion (5) to the lower portion (d) and the upper portion (6) to the lower portion (e) respectively as shown in FIG. 12B.

Figure 13:
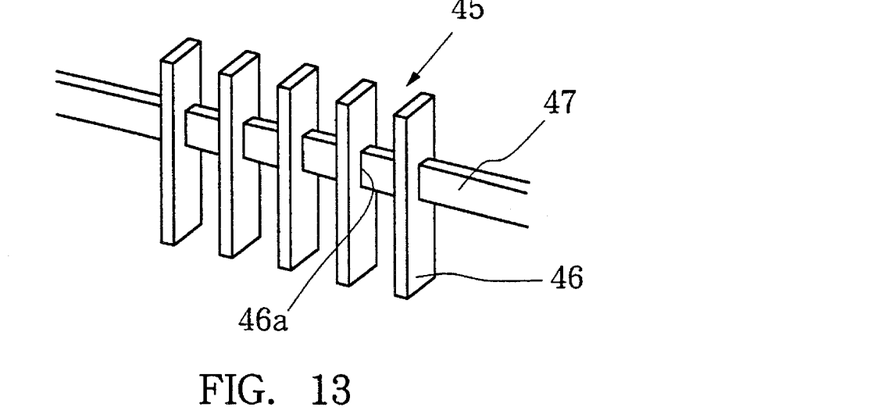
FIG. 13 is a perspective view showing a filler used in the embodiment of FIG. 11.
Figure 14:
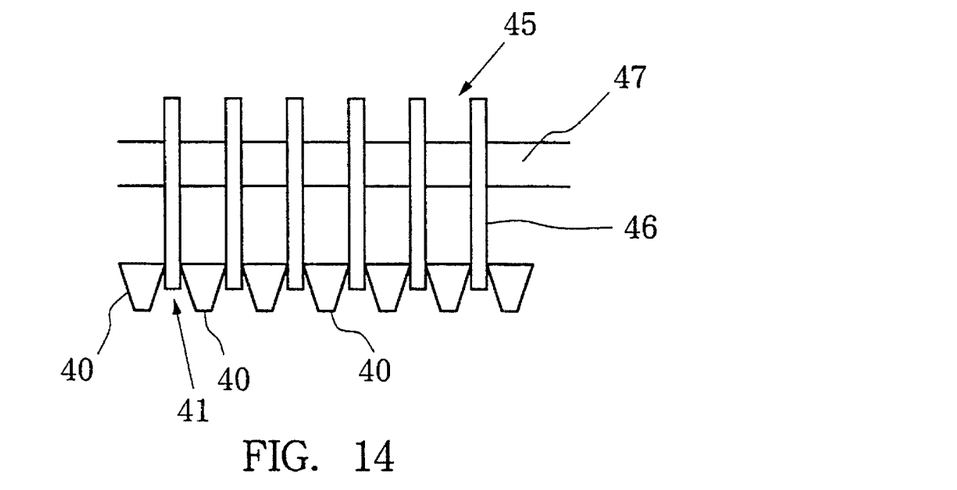
FIG. 14 is a view showing a state in which the filler is inserted in the slits of the parallel rings.

In this embodiment, a filler as shown in FIG. 13 is provided. The filler 45 has thin plate-like filler plates 46 each being provided in correspondence to each slit 41 of the wedge wire rings 40 and a holder rod 47 which is inserted in holder rod insertion apertures 46a formed in the upper portion of the filler plates 46 to fixedly hold the filler plates 46. The filler 45 is provided in the axial direction of the screen drum 2 in the container 8 in such a manner that the filler plates 46 are inserted in the slits 41.

Figures 15A, 15B:
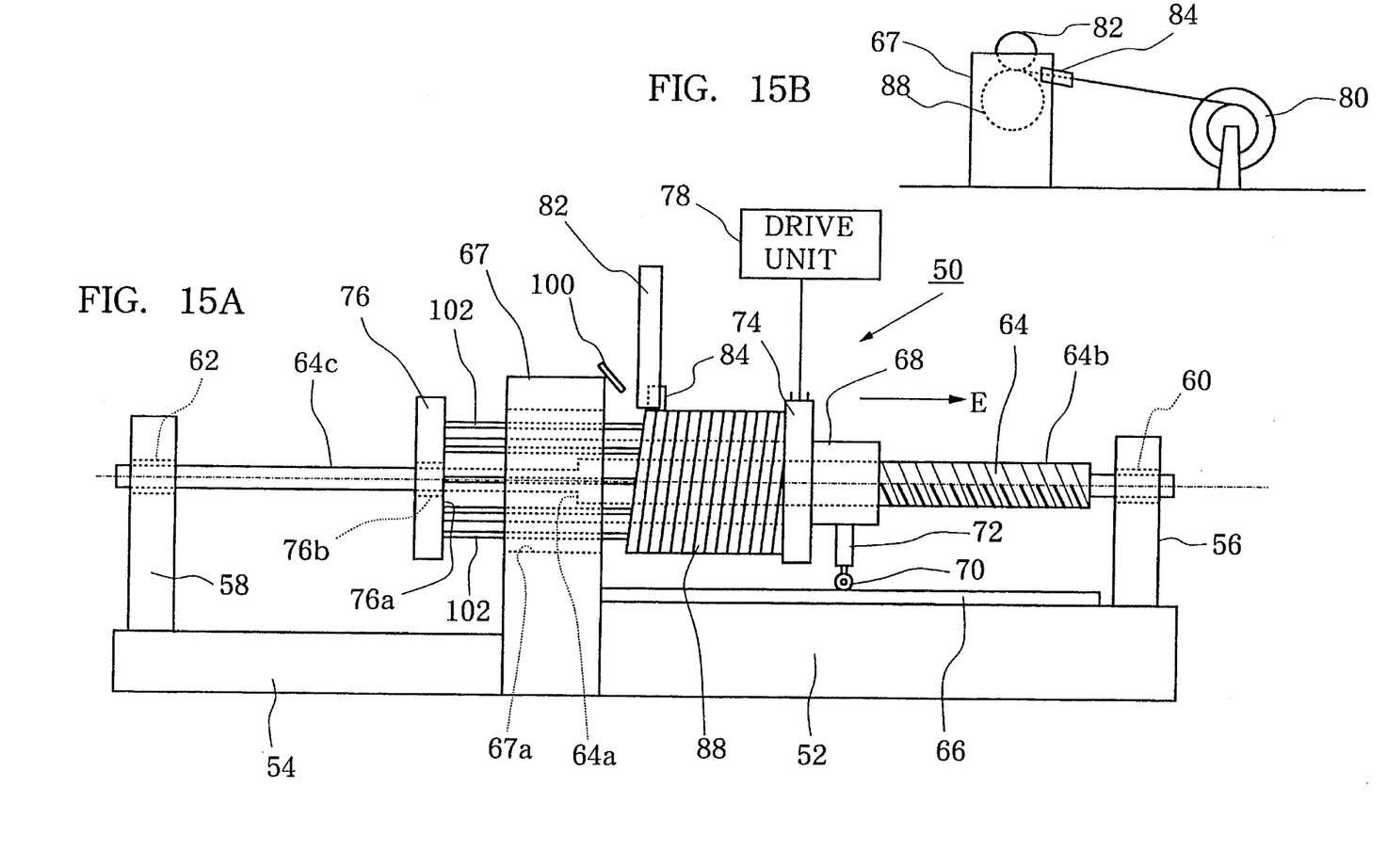
FIGS. 15A and 15B are views showing a device for manufacturing a screen drum used in the invention.
Figure 16A:
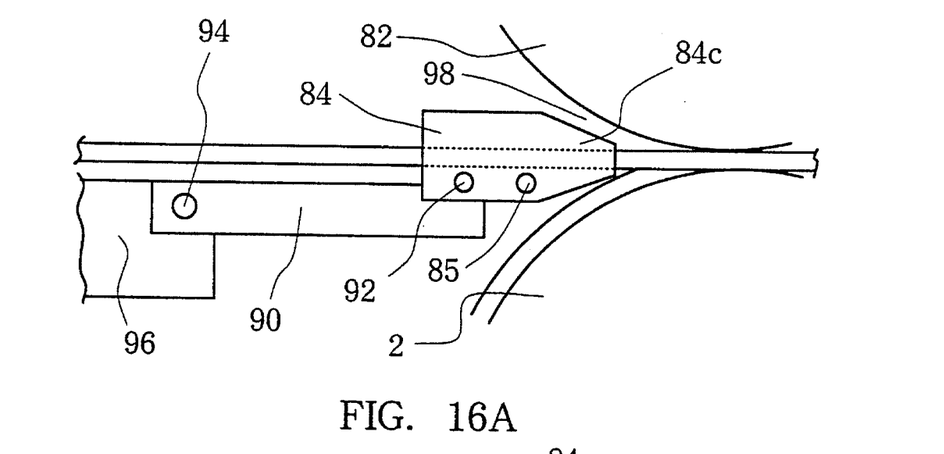
FIG. 16A is a front view showing a wedge wire holder used in the above device for manufacturing the screen drum.
Figure 16B:
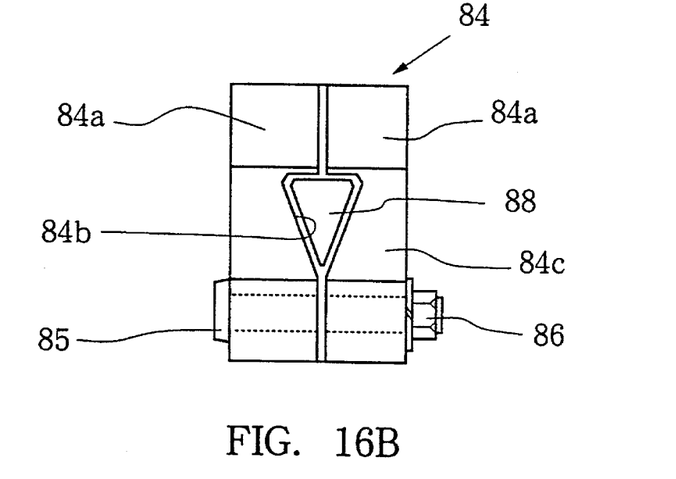
FIG. 16B is a side view of the wedge wire holder.
Figure 17:
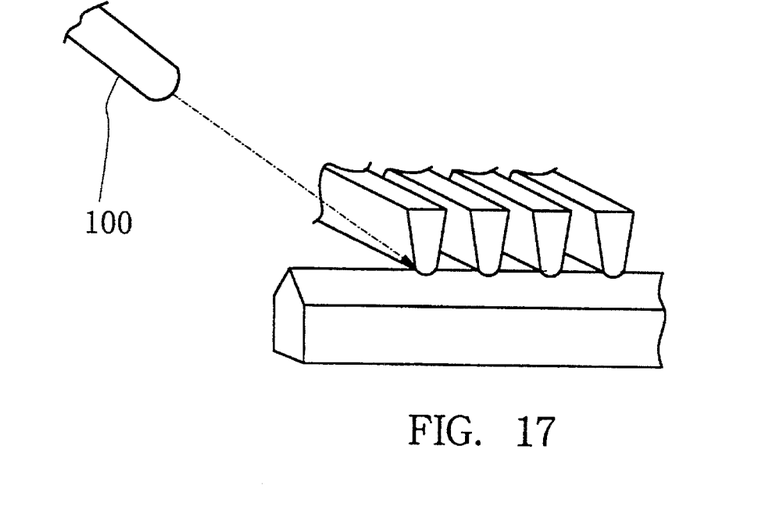
FIG. 17 is a perspective view showing a manner of laser welding used in the manufacturing device.

Referring now to FIGS. 15 to 17, a method for manufacturing a rotary drum screen used in the rotary drum type device for separating solid particles from a liquid according to the invention will be described.

A screen drum manufacturing apparatus 50 has a front bed 52 and a rear bed 54. A screw 64 is rotatably supported by bearings 60 and 62 which are mounted on support frames 56 and 58 provided on the front and rear beds 52 and 54. The screw 64 has a threaded front portion 64b of a large diameter, a central step portion 64a and an unthreaded rear portion 64c of a reduced diameter. Rails 66 are laid on the front bed 52 below the screw 64. A cylindrical screw cover 68 has a threaded inner periphery and is disposed coaxially with the screw 64 in threaded engagement with the screw 64. Wheels 70 are fixed to the front end portion of the screw cover 68 in such a manner that the wheels 70 can run along the rails 66. Thus, the screw cover 68 slides along the screw 64 as the latter is rotated.

An annular front support rod holder 74 is supported rotatably and not movably in the axial direction in the vicinity of a foreward end of the screw cover 68. An annular rear support rod holder 76 having a central opening 76b is supported rotatably and not movably in the axial direction on the reduced diameter portion 64c of the screw 64. A drive unit 78 for driving and rotating the front support rod holder 74 is connected to the front support rod holder 74. The drive unit 78 can rotate the front support rod holder 74 with a rotation speed necessary for realizing a desired width of the wedge wire slit. The rear support rod holder 76 is driven by the rotation of the front support rod holder 74. The rear support rod holder 76 has a smaller diameter than the central opening 67a formed in the welder support table 67 and can slide in the central opening 67a. Since the diameter of the large diameter portion 64b is larger than the diameter of the central opening 76b of the rear support rod holder 76, the movement of the rear support rod holder 76 in the advancing direction is prevented by abutting engagement of a front surface 76a of the holder 76 with the step portion 64b of the screw 64. The rear support rod holder 76 is rotated by rotation of the front support rod holder 74.

A wedge wire supply drum 80 storing wedge wire is disposed behind the welder support table 67. A disk-like pressure roll 82 which is disposed in parallel to the screw cover at a predetermined interval from the outer periphery of the screw cover 68 for pressing the wedge wire wound on the support rods to the support rods. The pressure roll 82 is rotated as the screen drum 2 is rotated.

A wedge wire holder 84 is provided at a location immediately before the wedge wire is wound on the support rods. This wedge wire holder 84 consists of holder portions 84a and 84b for enabling the wedge wire to pass through them as shown in FIGS. 16A and 16B. After passing the wedge wire, these holder portions 84a and 84b are fixed together by means of bolts 85 and nuts 86. The wedge wire holder 84 has a wedge wire insertion opening 84b having a size slightly larger than the cross section of the wedge wire and has a configuration similar to the cross section of the wedge wire and has a foremost end portion 84c having a configuration similar to a bird's bill. The holder 84 is fixed to a rod 90 by means of a bolt 92 and this rod 90 is pivotably mounted on a frame 96 pivotably in the vertical direction and unmovably in the horizontal direction. By inserting the bill-like foremost end portion 84c deeply in a gap 98 between the screen drum 2 to be formed and the pressure roll 82, accurate positioning of the wedge wire 88 can be realized.

A laser welder 100 of a known construction is disposed at a location immediately after the wedge wire is wound on the support rods.

Manufacturing of the screen drum is performed in the following steps:

(a) The above described apparatus is prepared.

(b) Support rods 102 having a projection in a radially outward end portion are placed circumferentially generally in a cylindrical configuration between the front support rod holder 74 and the rear support rod holder 76 and the end portions of the support rods 102 are held by the front and rear support rod holders 74 and 76.

(c) The cylindrically arranged support rods 102 are fed in the advancing direction (in the direction of arrow E in FIG. 15) by rotating the screw 64 and simultaneously the wedge wire 88 is fed from the wedge wire supply drum 80 and wound on the cylindrically arranged support rods 102 through the wedge wire holder 84.

(d) The wedge wire 88 is welded by the laser welder 100 at its inner apex to the projections of the support rods 102 at each crossing section.

(e) Upon completion of winding and welding of the wedge wire 88, the front and rear support rod holders 74 and 76 are released and a completed screen drum is taken out of the manufacturing apparatus 50.

What is claimed is:

1. A method of manufacturing a rotary screen drum comprises including a screw supported rotatably on a support frame rails laid under the screw;

a screw cover which extends coaxially with the screw and is threadedly engaged on the screw and has wheels rotatably engaged with the rails, said screw cover sliding along the screw by rotation of the screw;

an annular front support rod holder rotatably supported in the vicinity of a forward end of the screw cover for holding one end of a plurality of support rods;

an annular rear support rod holder rotatably supported in the vicinity of a rear end of the screw cover for holding the other end of the plurality of support rods;

drive means for driving and rotating the front support rod holder;

a wedge wire supply drum for storing a wedge wire and winding the wedge wire on the plurality of support rods;

a pressure roll which is disposed in parallel to the screw cover at a predetermined interval from the outer periphery of the screw cover for pressing the wedge wire wound on the plurality of support rods to the plurality of support rods;

a wedge wire holder which is mounted on a frame vertically pivotally at a location immediately before the wedge wire is wound on the support rods and has a wedge wire insertion opening having a size slightly larger than the cross section of the wedge wire and having a configuration similar to the cross section of the wedge wire and which has a foremost end portion having a configuration similar to a bird's bill; and a laser welder disposed at a location immediately after the wedge wire is wound on the support rods; the method comprising the steps of (a) placing said plurality of support rods between the front support rod holder and the rear support rod holder and holding the support rods by the front and rear support rod holders the plurality of support rods including a projection in a radially outward end portion circumferentially generally in a cylindrical configuration;

(b) feeding the cylindrical support rods in one direction by rotating the screw and simultaneously feeding the wedge wire from the wedge wire supply drum and winding the wedge wire on the plurality of support rods through the wedge wire holder; and (c) welding with said laser welder an inner apex portion of the wedge wire to the projections of the support rods at each crossing point of the wedge wire with the support rods.

* * * * *